US 6,567,731 B2

(12) United States Patent
Chandy

(10) Patent No.: US 6,567,731 B2
(45) Date of Patent: May 20, 2003

(54) SYSTEM AND METHOD INCORPORATING FEEDFORWARD FOR MOTOR VEHICLE CHASSIS CONTROL

(75) Inventor: Ashok Chandy, Fenton, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/935,274

(22) Filed: Aug. 22, 2001

(65) Prior Publication Data

US 2003/0045978 A1 Mar. 6, 2003

(51) Int. Cl.[7] .................................................. B62D 5/04
(52) U.S. Cl. ...................... 701/36; 180/168; 180/118; 180/338; 180/410; 73/1.37; 73/1.59
(58) Field of Search .............................. 701/36, 37, 28; 180/140, 142, 79.1, 197, 410, 168, 118, 338; 702/167; 290/40 C; 73/1.37, 1.38, 1.59

(56) References Cited

U.S. PATENT DOCUMENTS

| 4,842,089 A | | 6/1989 | Kimbrough et al. ....... 180/74.1 |
| 5,448,481 A | * | 9/1995 | Asanuma et al. ........... 180/140 |
| 5,606,502 A | * | 2/1997 | Adachi et al. .............. 180/408 |
| 5,857,937 A | * | 1/1999 | Ashizawa et al. ........... 477/46 |
| 5,979,581 A | * | 11/1999 | Ravani et al. .............. 180/168 |
| 6,134,509 A | * | 10/2000 | Furusho et al. ............. 702/167 |
| 6,181,020 B1 | * | 1/2001 | Uchida et al. ............ 290/40 C |
| 6,453,226 B1 | * | 9/2002 | Hac et al. ..................... 701/48 |

* cited by examiner

Primary Examiner—Thomas G. Black
Assistant Examiner—Tuan L To
(74) Attorney, Agent, or Firm—Scott A. McBain

(57) ABSTRACT

A control system for a plurality of motor vehicle chassis subsystems comprises a reference model, a state estimator, a feedforward controller, and a feedback controller. The reference model computes desired states of the chassis subsystems. The state estimator estimates actual states of the vehicle. The feedforward controller computes a control value based on input from the reference model, and the feedback controller computes a control value by comparing the estimates of actual states with the desired states.

13 Claims, 3 Drawing Sheets

SYSTEM AND METHOD INCORPORATING FEEDFORWARD FOR MOTOR VEHICLE CHASSIS CONTROL

TECHNICAL FIELD OF THE INVENTION

The present invention relates to control systems for a motor vehicle chassis, and more particularly to a system and method including a feedforward feature for controlling the chassis.

BACKGROUND OF THE INVENTION

Unified or integrated chassis control systems have been proposed which control the brakes, steering, and suspension of a motor vehicle. The purpose of unified chassis control is to improve vehicle performance in all driving conditions by coordinating control of the chassis subsystems. Unified chassis control systems typically utilize a supervisory control concept that utilizes three fundamental blocks: a reference model, a state estimator, and a vehicle control. The vehicle control element normally incorporates a feedback control. This element computes control values by comparing actual states obtained from the state estimator with desired states from the reference model.

It is well known that when brakes are applied during a steering maneuver, a yaw rate error is induced. It such circumstances, the conventional chassis control systems are relatively slow to compensate.

SUMMARY OF THE INVENTION

The present invention is a system and method for controlling a plurality of motor vehicle chassis subsystems. The control system comprises a reference model, a state estimator, a feedforward controller, and a feedback controller. The reference model computes desired states of the chassis subsystems. The state estimator estimates actual states of the vehicle. The feedforward controller computes a control value based on the reference model, and the feedback controller computes a control value by comparing the estimates of actual states with the desired states.

Accordingly, it is an object of the present invention to provide a control system of the type described above which presents a standard methodology to integrate feedforward control into a unified chassis control supervisor that overcomes several known deficiencies.

Another object of the present invention is to provide a control system of the type described above which improves control response.

Still another object of the present invention is to provide a control system of the type described above which improves response decoupling.

Still another object of the present invention is to provide a control system of the type described above which allows single-point tuning.

Still another object of the present invention is to provide a control system of the type described above which incorporates driver input.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
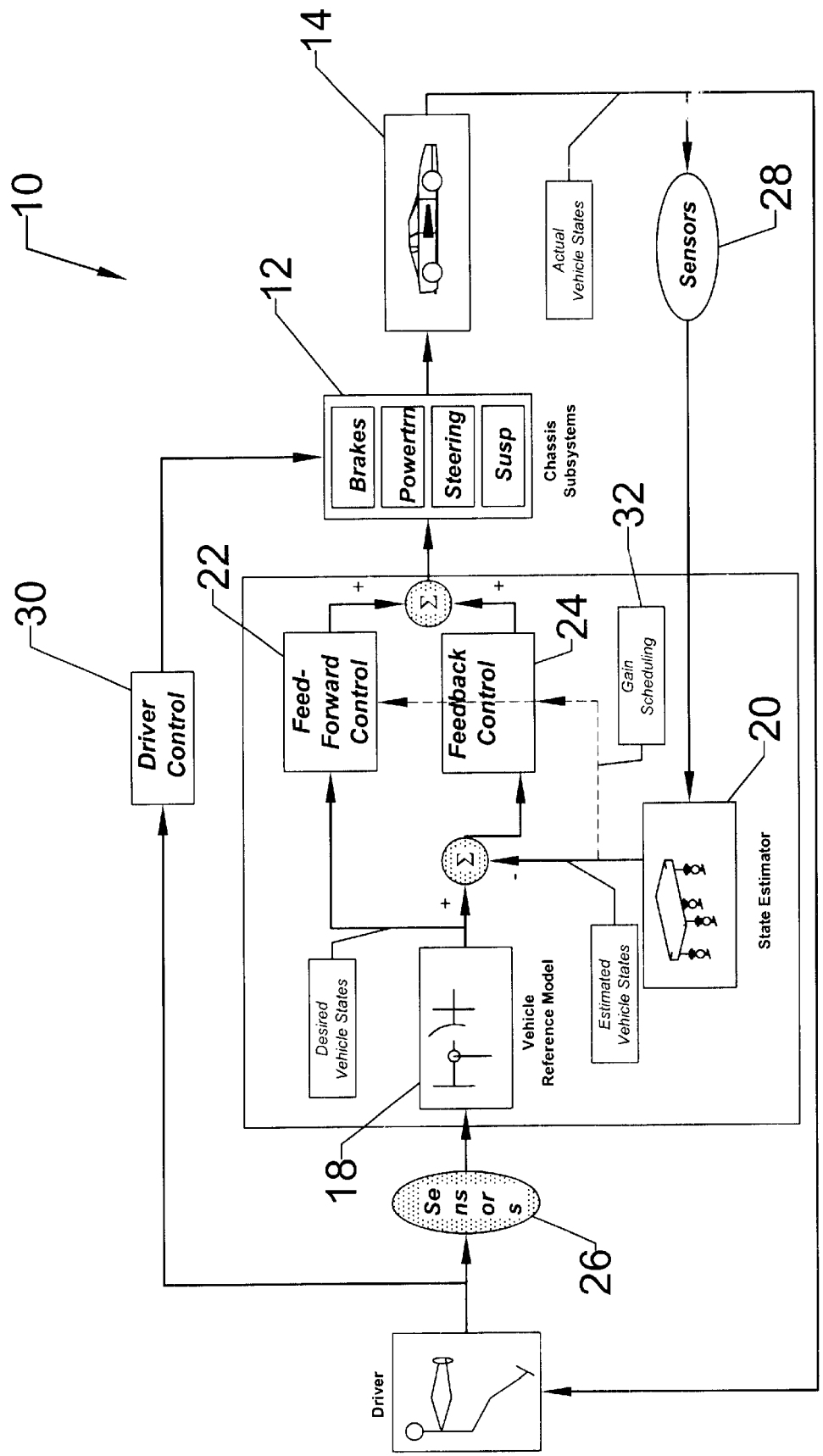
FIG. 1 is a schematic view of a chassis control system according to the present invention for a motor vehicle.

FIG. 1 shows a control system 10 according to the present invention for chassis subsystems 12 of a motor vehicle 14. A supervisory controller 16 performs many estimation and control functions conventionally performed by the subsystems themselves. The supervisory controller 16 consists of a reference model 18, an estimator 20 of vehicle state and environment, and a vehicle level controller including a feedforward controller 22 and a feedback controller 24.

The reference model 18 determines the desired vehicle response, in terms of measureable variables, to driver inputs using measured inputs from sensors 26 and some estimates. The estimator 20 uses measured inputs such as from sensors 26, measured outputs such as from sensors 28, and some preliminary estimates from individual modules to generate estimates of vehicle states which are not measured directly. The estimator 20 may also estimate variables describing potentially relevant environmental effects such as surface coeeficient of adhesion, bank angle of the road surface, roughness of the road surface, and others. The supervisory controller 16 uses the desired, measured and estimated values to determine the corrective action on the vehicle level, for example moments and forces acting on the vehicle, that will bring the vehicle response into confromance with the desired response. The supervisory controller 16 also performs partition of control among the subsystems 12. Thus, the supervisory controller 16 decides whether and to what extent to activate any subsystem(s) in a given situation.

The feedforward controller 22 computes a control value based on input from the reference model 18. The present invention optionally provides a driver to chassis-subsystem transfer function 30. In the case of steering, this could represent the transfer function between steering wheel position and road wheel position. In the case of braking, this could represent the transfer function between pedal force and caliper forces at each of the braked wheels of the motor vehicle. This transfer function can be included in the feedforward and feedback control design. For suspension systems, however, this block does not exist. Gain scheduling represented by block 32, such as may be required in a highly non-linear system such as a vehicle chassis, is provided for both feedback and feedforward control as a function of vehicle states. It should be noted that the lines on the block diagram in FIG. 1 show primary control paths. In reality, due to the non-linear nature of vehicle dynamics, the present invention contemplates other links such as bank angle from the state estimator 20 to the feedforward controller 22. A control term based on the driver inputs (inputs to the reference model) is also appropriate and fits the definition of feedforward control.

Figure 2:
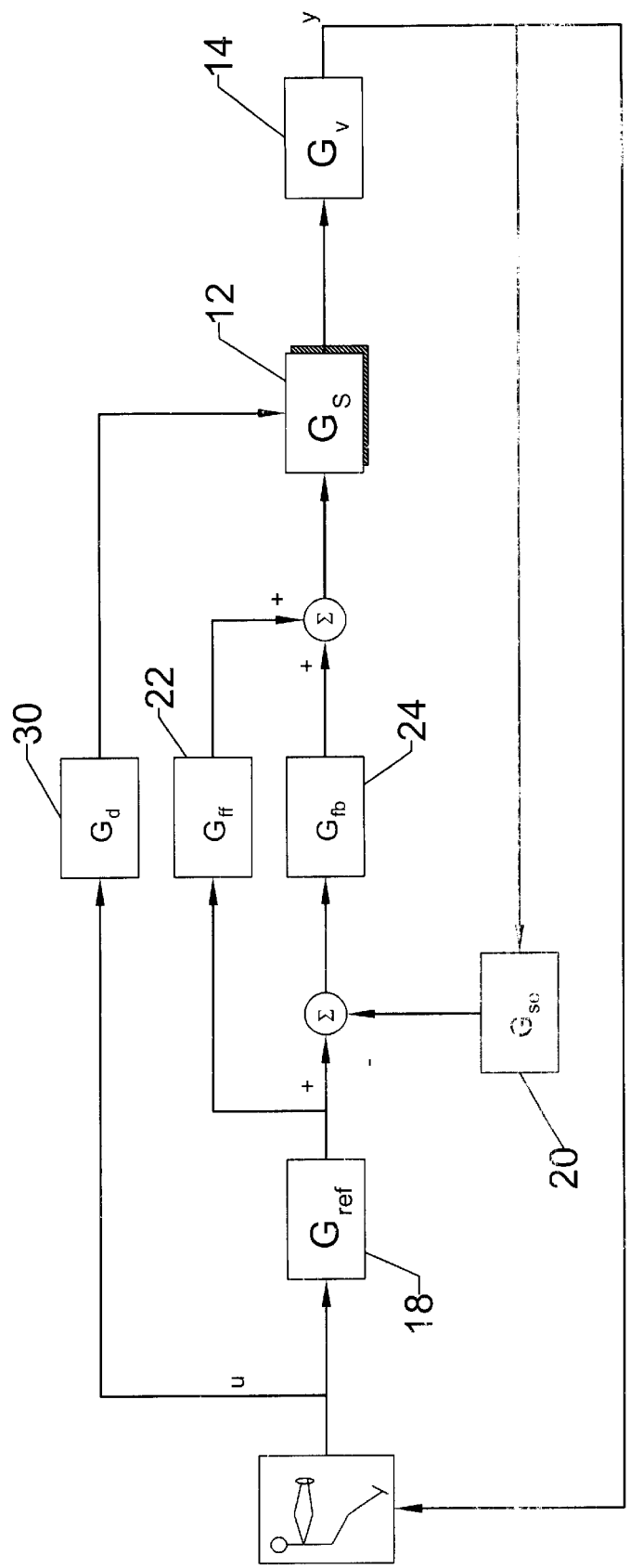
FIG. 2 is another schematic view of the chassis control system.

FIG. 2 mathmatically presents the same functions shown in FIG. 1 as transfer functions where $G_x$ represents the transfer function for feedback (fb), feedforward (ff), a reference state (ref), the chassis subsystems (s), driver (d), vehicle (v), and state estimator (se). The ratio between vehicle output "y" and driver input "u" can be written as:

$$\frac{y}{u_d} = \frac{([G_{fb} + G_{ff}]G_{ref}G_s + G_d)G_v}{G_{fb}G_sG_{se}G_v + 1}$$

Setting the desired behavior of the relationship $y/u_d$ equal to the reference transfer function $G_{ref}$, and substituting, yields the desired feedforward transfer function:

$$G_{ff} = \frac{([G_{se} - 1]G_{fb}G_sG_v + 1)G_{ref} - G_dG_v}{G_{ref}G_sG_v}$$

If the state estimator 20 were a perfect estimator, this equation can be significantly simplified to:

$$G_{ff} = \frac{1 - \frac{G_dG_v}{G_{ref}}}{G_sG_v}$$

For subsystems such as suspension where there is no direct driver control, the feedforward transfer function simply becomes an inversion of the chassis subsystem and the actual vehicle.

$$G_{ff} = \frac{1}{G_sG_v}$$

In all but the most trivial cases, the transfer functions represented by G are matrices and thus require inversion when they appear in the denominator in the above equation. In many cases, these matrices may not be square or invertible. In such cases, there are several mathematical and numerical techniques are known that can be applied to obtain pseudo-inverses or approximations.

Figure 3:
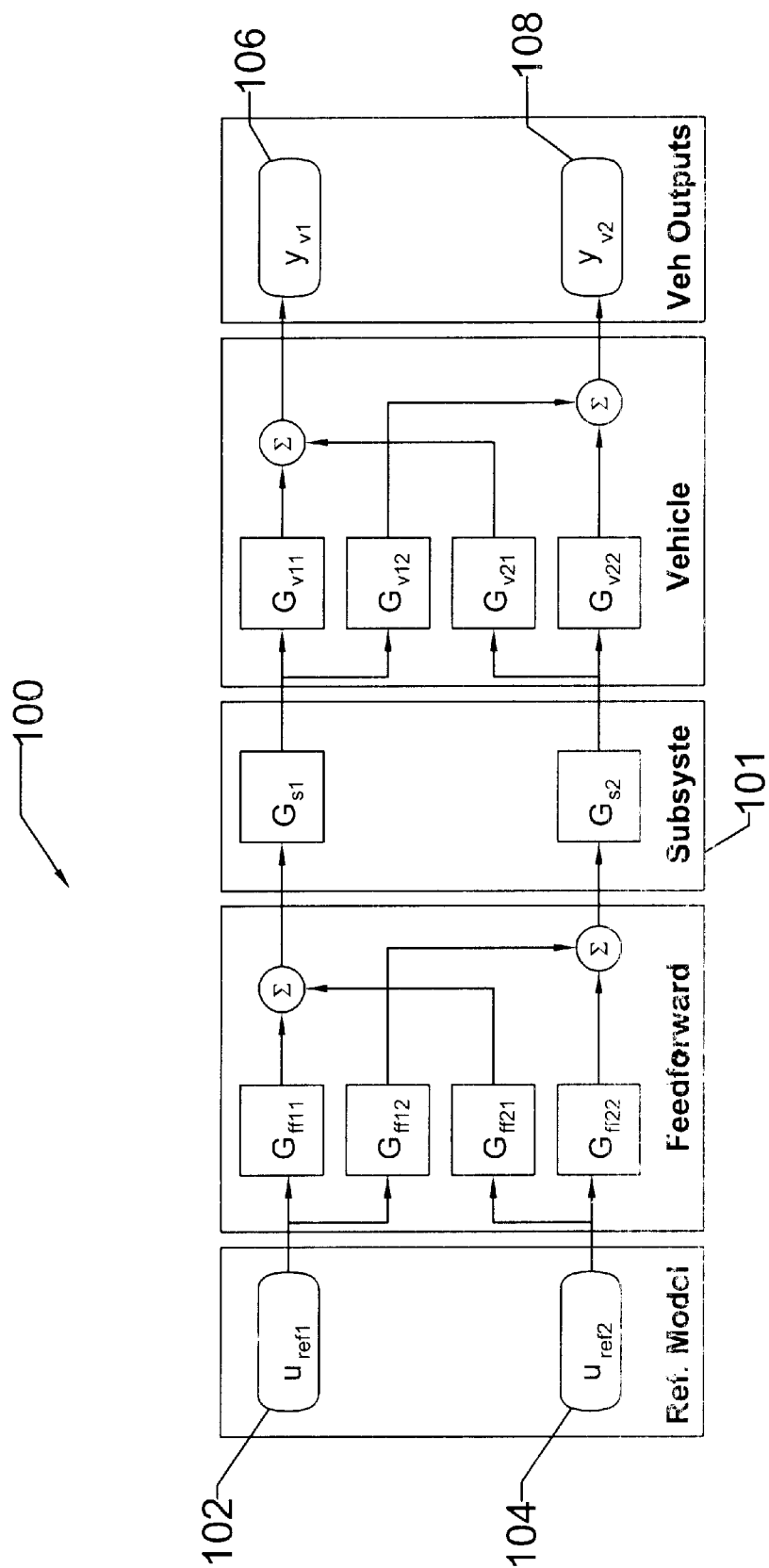
FIG. 3 is a schematic view of a representative example of a feedforward portion of a control system for two chassis subsystems.

Regardless of the approach used in obtaining the feedforward terms, several benefits are realized using the present invention. FIG. 3 shows a representative example of a control system 100 for two chassis subsystems 101. The control system 100 processes driver inputs 102 and 104. The advantages of the present invention are apparent when considering an example where one subsystem is braking and the other front or rear steering. In many automotive chassis subsystems, there is a strong level of coupling that exists between chassis subsystems. For example, when braking in a turn, it is well known that a yaw rate error is induced due to the increased longitudinal forces in the tires. The feedforward control provided by the present invention "cross-couples" the inputs 102 and 104, and generates corrective steering and/or braking outputs 106 and 108 that will nominally keep the yaw rate error to a minimum and thus de-couples the outputs 106 and 108. Closed loop control provided by the feedback controller 24 corrects for any remaining uncompensated error. This approach is also significantly faster than responding to a closed loop current after the yaw rate error has already occurred, and applies equally well to body roll and steering, body pitch when braking, and similar cases.

Feedforward control has been used in the past, especially in the case of rear-steer steering systems such as is described in U.S. Pat. No. 4,842,089, the disclosure of which is hereby incorporated by reference. Feedforward control, as it is well known in the art, is an open-loop control concept that attempts to provide a nominal desired behavior without regard to the actual response of the plant. However, for applications to date, this feedforward is not considered a part of the supervisor and is tuned and calibrated only in the context of the local rear-steer subsystem. The disadvantage of this approach is that the reference model of the supervisor needs to be re-calibrated every time the feedforward relationship in the rear-steer system is altered. Existing chassis systems are therefore not subject to true single-point tuning. Using the basic mathematical procedures outlined above, the feedforward control terms can be computed as a function of the desired reference model behavior. This single-point tuning is an improvement compared to existing strategies where feedforward is implemented as a local subsystem or actuator feature as in the open-loop component of steering systems such as that described in the '089 patent. Automated tools can facilitate this process.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A control system for a plurality of motor vehicle chassis subsystems, the control system comprising:

a reference model which computes desired states of the chassis subsystems;

a state estimator which estimates actual states of the vehicle;

a feedforward controller which computes a control value based on input from the reference model;

a feedback controller which computes a control value by comparing the estimates of actual states with desired states; and means for affecting the chassis subsystems based on the control value computed by the feedforward controller and based on the control value computed by the feedback controller.

2. The control system of claim 1 further comprising:

direct driver control of one of the chassis subsystem.

3. The control system of claim 1 wherein the plurality of motor vehicle chassis subsystems comprises a brake subsystem.

4. The control system of claim 1 wherein the plurality of motor vehicle chassis subsystems comprises a powertrain subsystem.

5. The control system of claim 1 wherein the plurality of motor vehicle chassis subsystems comprises a steering subsystem.

6. The control system of claim 1 wherein the plurality of motor vehicle chassis subsystems comprises a suspension subsystem.

7. A method of controlling a plurality of motor vehicle chassis subsystems, the method comprising:

computing desired states of the chassis subsystems;

estimating actual states of the vehicle;

computing a control value based on the desired states of the chassis subsystems;

computing a control value by comparing the estimates of actual states with desired states; and affecting the chassis subsystems based on the control value computed by the feedforward controller and based on the control value computed by the feedback controller.

8. The method of claim 7 further comprising:

allowing a driver of the motor vehicle to directly control one of the chassis subsystems.

9. The method of claim 7 wherein the plurality of motor vehicle chassis subsystems comprises a brake subsystem.

10. The methods of claim 7 wherein the plurality of motor vehicle chassis subsystems comprises a powertrain subsystem.

11. The method of claim 7 wherein the plurality of motor vehicle chassis subsystems comprises a steering subsystem.

12. The method of claim 7 wherein the plurality of motor vehicle chassis subsystems comprises a suspension subsystem.

13. A control system for a first motor vehicle chassis subsystem, the control system comprising:

a reference model which computes a desired state of a second chassis subsystem;

a state estimator which estimates actual states of the vehicle;

a feedforward controller which computes a control value based on input from the reference model;

a feedback controller which computes a control value by comparing the estimates of actual states with the desired state; and means for affecting the first chassis subsystem based on the control value computed by the feedforward controller and based on the control value computed by the feedback controller.

* * * * *